(12) United States Patent
Kannan

(10) Patent No.: US 8,121,091 B2
(45) Date of Patent: Feb. 21, 2012

(54) METHOD AND SYSTEM FOR THE REDUCTION OF SCANNING TIME WHILE ROAMING

(75) Inventor: Venkatesh Kannan, Sunnyvale, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 741 days.

(21) Appl. No.: 12/207,232

(22) Filed: Sep. 9, 2008

(65) Prior Publication Data

US 2010/0061335 A1 Mar. 11, 2010

(51) Int. Cl.
  *H04W 4/00* (2009.01)
(52) U.S. Cl. ..................................... 370/331; 455/432.1
(58) Field of Classification Search .................. 370/331, 370/332; 455/432.1, 434, 436
  See application file for complete search history.

(56) References Cited

U.S. PATENT DOCUMENTS

| | | | |
|---|---|---|---|
| 6,052,598 A * | 4/2000 | Rudrapatna et al. | 455/456.1 |
| 2007/0025293 A1* | 2/2007 | Choi | 370/331 |
| 2007/0268859 A1* | 11/2007 | Yao et al. | 370/328 |
| 2008/0014934 A1* | 1/2008 | Balasubramanian et al. | 455/434 |
| 2008/0188228 A1* | 8/2008 | Pecen et al. | 455/449 |
| 2008/0205340 A1* | 8/2008 | Meylan et al. | 370/331 |
| 2009/0203394 A1* | 8/2009 | Shaffer et al. | 455/525 |

* cited by examiner

*Primary Examiner* — Brian Nguyen

(57) ABSTRACT

Described are systems, methods, and devices used for reducing scanning time while communicating between wireless mobile computing devices within a wireless communications network. The method includes the following step(s): receiving communication data from one or more APs within a network, the communication data being specific to each of the one or more APs and transmitting the communication data to an MU within the network. The MU is associated with a first AP and the MU associates with a second AP based on the communication data as the MU roams to the second AP. The method further includes the steps of: associating, by an MU, with a first AP within a network, receiving communication data from the first AP, the communication data including information specific to each of one or more further APs, and associating with one of the further APs based on the communication data.

12 Claims, 4 Drawing Sheets

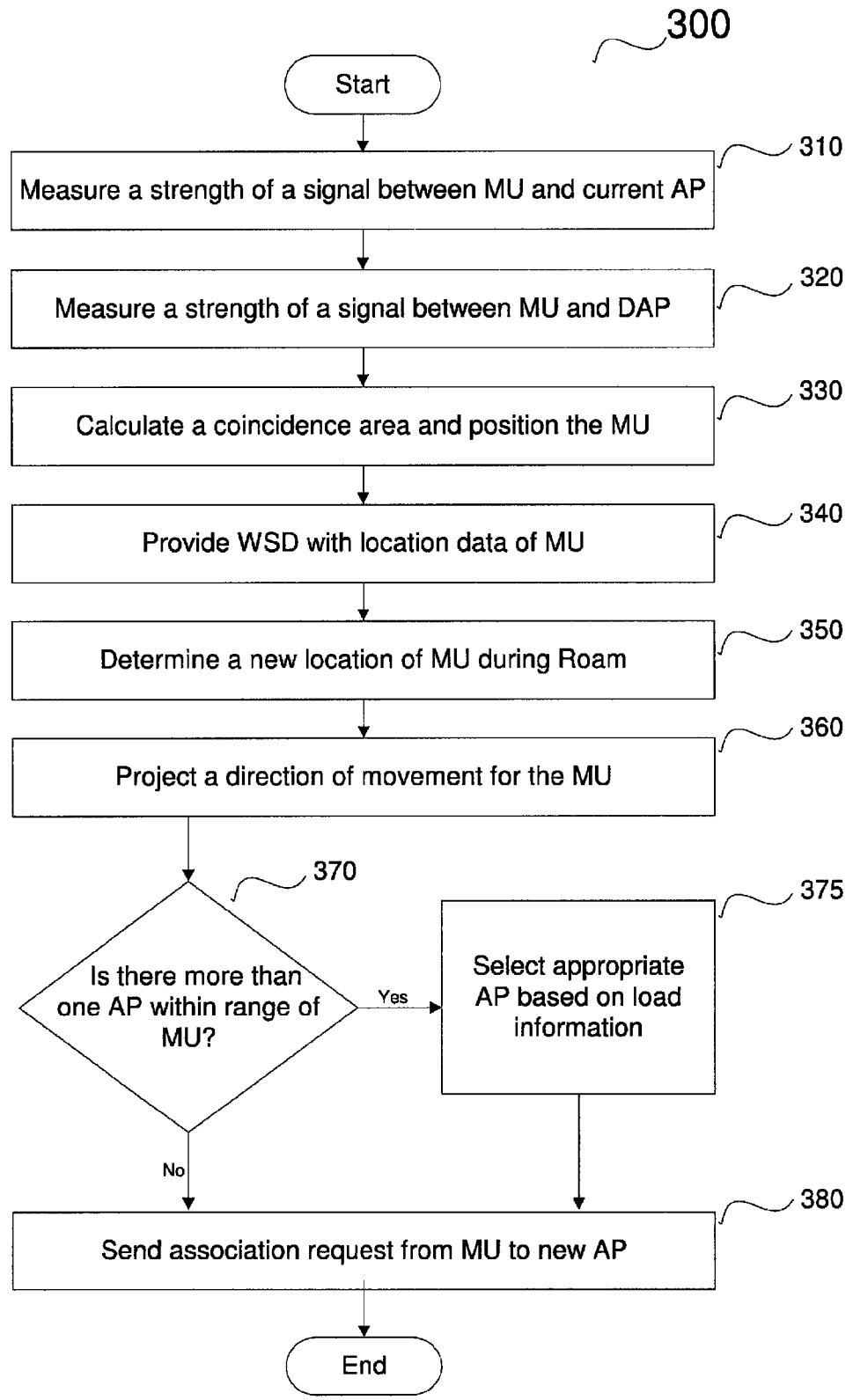

METHOD AND SYSTEM FOR THE REDUCTION OF SCANNING TIME WHILE ROAMING

FIELD OF THE INVENTION

The present invention relates to systems and methods used for reducing scanning time while communicating between wireless mobile computing devices within a wireless communications network.

BACKGROUND

Wireless networking has emerged as an inexpensive technology for connecting multiple users with other users within a wireless coverage area of a network as well as providing connections to other external networks, such as the World Wide Web. An exemplary wireless network may be a wireless local area network ("WLAN") for providing radio communication between several devices using at least one wireless protocol. A wireless local area network may use radio frequency ("RF") communication channels to communicate between multiple mobile units ("MUs") and multiple stationary access points. The access points or access ports (both may be referred to herein as "APs") of the WLAN may be positioned in various locations of the environment to prevent any coverage gaps in the wireless coverage.

A WLAN is a flexible data communications system that may either replace or extend a conventional, wired network. The WLAN may provide added functionality and mobility over a distributed environment. That is, the wired LAN transmits data from a first computing device to a further computing device across cables or wires that provide a link to the network and any devices connected thereto. The WLAN, however, relies upon radio waves to transfer data between wireless devices. Data is superimposed onto the radio wave through a process called modulation, whereby a carrier wave acts as a transmission medium.

Exchange of data between the wireless devices over the WLAN has been defined and regulated by standards ratified by the Institute of Electrical and Electronics Engineering (IEEE). These standards include a communication protocol generally known as 802.11, and having several versions, including 802.11a, 802.11b ("Wi-Fi"), 802.11e, 802.11g, 802.11n, and 802.11r. Recently, there has been a surge in deployment of 802.11-based wireless infrastructure networks to provide WLAN data sharing and wireless Internet access services in public places (e.g., "hot spots").

In any wireless communications network, the term "roaming" may be used to describe the extension of service to an MU in motion from one AP coverage area to another AP coverage area. When a wireless user roams within a covered region during a call session, a network switch (or other network component) may transfer, or handoff, the MU between APs. A handoff may occur if the MU moves out of range of a current AP and can receive a stronger signal from a neighboring AP. In addition, a handoff may occur if the current AP has reached a servicing capacity and the neighboring AP is available for service. However, as an MU is handed-off from one AP to the next, portions of the "digitized" voice data may be lost during the transition.

SUMMARY OF THE INVENTION

The present invention relates to a method including receiving communication data from one or more access points ("APs") within a network, the communication data being specific to each of the one or more APs and transmitting the communication data to a mobile unit ("MU") within the network, wherein the MU is associated with a first AP and the MU associates with a second AP based on the communication data as the MU roams to the second AP.

The present invention further relates to a method including associating, by a mobile unit ("MU"), with a first access point ("AP") within a network, receiving communication data from the first AP, the communication data including information specific to each of one or more further APs, and associating with one of the further APs based on the communication data.

The present invention further relates to a system including a first access point ("AP") receiving communication data from one or more additional APs within a network, the communication data being specific to each of the one or more additional APs, the first AP transmitting the communication data to a mobile unit ("MU") within the network, wherein the MU is associated with the first AP, and a wireless switching device associating the MU with one of the additional APs based on the communication data as the MU roams toward the second AP.

The present invention further relates to a computing device including a data receiving means for receiving communication data from one or more access points ("APs") within a network, the communication data being specific to each of the one or more APs, a transmitting means for transmitting the communication data a mobile unit ("MU") within the network, wherein the MU is associated with a first AP, and the MU associates with a second AP based on the communication data as the MU roams toward the second AP.

The present invention further relates to a mobile computing device including a communicating means for communicating with a first access point ("AP") within a network, wherein the MU is associated with a first AP, a data receiving means for receiving communication data within the network, wherein the communication data including information specific to each of one or more further APs in the network, and an associating means for associating with one of the further APs based on the communication data.

BRIEF DESCRIPTION OF THE DRAWING

FIG. 3 shows an exemplary method for eliminating the scanning time of the MU while roaming within the wireless communications according to the present invention.

DETAILED DESCRIPTION

Figure 1:
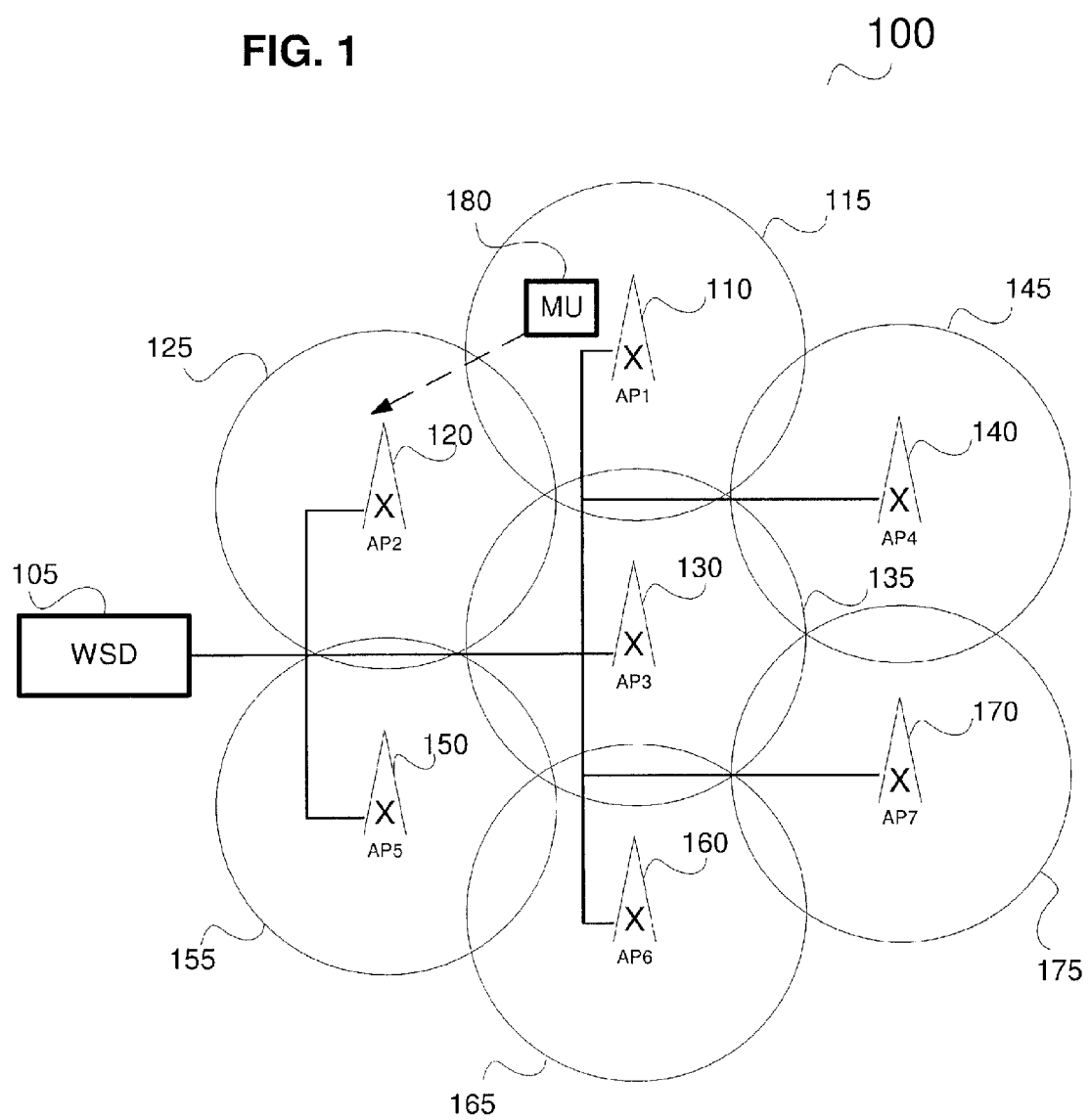
FIG. 1 shows an exemplary system for reducing and/or eliminating scanning time during wireless communications according to the present invention.

The exemplary embodiments of the present invention may be further understood with reference to the following description of exemplary embodiments and the related appended drawings, wherein like elements are provided with the same reference numerals. The exemplary embodiments of the present invention are related to systems and methods used for communicating between wireless mobile units ("MUs") and access points ("APs") within a wireless communications network. Specifically, the exemplary embodiments relate to systems and methods for reducing scanning time while communicating between wireless mobile computing devices within a wireless communications network.

The exemplary embodiments allow a user of the wireless device to input a channel selection and/or an access point selection prior to the initiation of the scanning process. As more wireless streaming applications and high priority data applications (e.g., Voice over Internet Protocol ("VoIP") communication, video data streams, etc.) are incorporated into MUs, there is a growing need to reduce latency in data transmission as the MU roams between APs. Furthermore, there is a need to reduce packet loss and retransmissions of data during periods of heavy traffic. Thus, the present invention may reduce scanning time while the MU roams between the multiple APs. Furthermore, the present invention may also eliminate scanning time while the MU roams between the multiple APs.

Those skilled in the art will understand that the term "AP" according to the present invention may also be used to describe access ports or any other device that is capable of receiving and transmitting wireless signals within a network architecture in accordance with the principles and functionality described herein. Thus, the use of a wireless Access Point is only exemplary. Furthermore, those skilled in the art would understand that the network architecture may include any number and type of MUs, such as, for example, personal digital assistants ("PDAs"), cell phones, VoIP-based wireless/wired phones, laptops, handheld computers, portable barcode scanners, etc. Those skilled in the art would further understand that the exemplary MU may include a non-mobile computing device attached to a wireless device (e.g., a desktop computer with a network interface card).

In order for wireless voice communications to be possible, the audio input, or voice data, must be digitized (or "packetized") for transmission within the network. This process involves the compression and separation of the voice data into short digital audio packets, for example, on the order of 10 to 30 milliseconds. Once the voice data is digitized, it may be transmitted through the network towards a predetermined destination, such as an AP or an MU. However, during the transmission, a number of packets may fail to reach the destination or may not arrive in proper sequence. The failure of one or more packets to reach the destination over a computer network may be termed "packet loss." Packet loss may be caused by a number of factors, such as signal degradation, network links operating at maximum capacity, corrupted packets, defective networking equipment, etc. In addition, the likelihood of packet loss may drastically increase as a MU roams from one AP to another AP. With regards to voice data, packet loss may result in transmission interruptions such as voice dropout, distorted audio (e.g., transmission hiccups), loss of connectivity, or simple degradation of voice quality.

Within a conventional wireless communication network, an MU decides to roam when a detected strength of signal between the AP and the MU drops below a certain threshold level. Accordingly, the MU starts scanning for one or more beacons from additional APs in all available channels of a band. This scanning process may take an extended period of time (e.g., 400 milliseconds), depending on the number of channels present in the band. Therefore, for voice and other real-time applications, there will be a detectable latency while the MU scans during the roaming period. Furthermore, while there is heavy traffic, the latency may lead to more retransmission and loss of packets.

FIG. 1 shows an exemplary system 100 for reducing and/or eliminating scanning time during wireless communications according to the present invention. Accordingly, the system 100 may include a wireless network, such as a VoIP network or a wireless local area network ("WLAN"), deployed within an operating environment. The system 100 may include a wireless switch infrastructure that includes a wireless switching device 105 as well as a plurality of APs, namely AP1 110-AP7 170, wherein each AP has a respective coverage area 115-175. The system 100 may further include one or more mobile computing devices, such as an MU 180, wirelessly communicating with one or more of the APs 110-170. Those skilled in the art will understand that the communication system 100 is only exemplary and that the present invention may be applied to any type of wireless network topology.

The wireless switching device 105 may be a robust hardware component that controls the connections of the APs 110-170 of the wireless communication system 100. The wireless switching device 105 may be responsible for the management of traffic and AP handoffs for the MU 180, as well as the security of the data transferred over the network. In other words, the wireless switching device 105 may monitor the status of the APs 110-170 in order to detect a failure of an AP or when an AP has reached maximum capacity. Upon such detection, the wireless switching device 105 may route the data traffic via another AP. In addition, the wireless switching device 105 may be connected to each of the APs 110-170 via a wired or wireless connection. Again, as described above in other network topologies, these functions may be carried out by other devices.

Those skilled in the art will understand that the present invention does not need to be implemented on a network including a wireless switch. That is, the present invention may be implemented on any network that is capable of handling VoIP, video, or other packetized transmissions in accordance with the principles and functionality described herein. Thus, the use of a wireless switch based network is only exemplary.

In addition, the operating environment may be, for example, an enclosed environment (e.g., a warehouse, office, home, department store, etc.) or an open-air environment (e.g., park, campus, etc.) or a combination thereof. While the exemplary network may be described as being a wireless network infrastructure, the present invention may also be implemented into a wired infrastructure having a wireless AP. Furthermore, it should be noted that aside from a WLAN, the exemplary embodiments of the present invention may be implemented within any wireless network architecture, such as, for example, as a mesh network (e.g., an ad-hoc network), a wireless personal area network ("WPAN") (e.g., Bluetooth, ZigBee), etc.

The MU 180 may operate within the system 100 to provide a user with wireless communication services, such as VoIP service. Accordingly, the MU 180 may be a mobile phone designed to work with wireless Internet networks. It should be noted that while the MU 180 may function within the exemplary system 100, the MU 180 may also operate within a separate standard cellular network thereby allow the MU 180 to have dual modes of operation. Initially, the MU 180 may be situated within the coverage area 115 of the AP1 110. All data packets (e.g., voice or video packets) directed to or from the MU 180 may be received or transmitted through the AP1 110 via the wireless switching device 105.

Radio frequency ("RF") signals including data packets may be transmitted between the MU 180 and the APs 110-170 over a radio channel. As understood by those skilled in the art, the data packets may be transmitted using a modulated RF signal having a common frequency (e.g., 2.4 GHz, 5 GHz). Furthermore, the data packets may include conventional 802.11 packets, such as, authentication, control and data packets. The data packets travel between the APs 110-170 and the MU 180 along a plurality of paths within the operating environment 110. While the exemplary embodiments are described with reference to communication using the 802.11x standard, those skilled in the art will understand that the present invention may be implemented on any wireless network regardless of the communication protocol.

When the MU 180 roams from the coverage area 115 of the AP1 110 to the coverage area 125 of the AP2 120 (as indicated by the arrow in FIG. 1), the wireless switching device 105 may redirect transmission of data packets intended for the MU 180 from the AP1 110 to the AP2 120. Thus, as the MU 180 approaches the border of coverage area 115 and enters into coverage area 125, the wireless switching device 105 is able to ensure delivery of the data packets to the MU 180 from the most appropriate AP within the wireless system 100.

However, as the MU 180 is handed-off between the neighboring APs 110-140, portions of the data may be lost during the transition. When the MU 180 is conducting applications that demand high data-transfer rates, such as wireless VoIP communications, the handoff during a roam may significantly affect the quality of the application. Specifically, data transmitted from either the MU 180 or one of the APs 110-140 may fail to reach the destination or may be delayed during a roam. The failure of any data to reach the destination may result in transmission interruptions such as voice dropout, distorted audio (e.g., echoing, transmission hiccups), loss of connectivity, or simply degradation of voice quality. As described above, the exemplary embodiments of the system 100 may be described with reference to voice communications. However, the present invention may be implemented to improve communication of any type, such as, for example, the communications of data packets, control packets, management packets, real-time packets, streaming multimedia packets, etc.

According to the exemplary embodiments of the present invention, the system 100 may reduce the time required for the MU 180 to scan while roaming by informing the MU of a specific channel of neighboring APs prior to the MU initiating the scanning process. Specifically, as will be described in greater detail below with reference to FIG. 2, each of the APs 110-170 in the system 100 may receive respective channel assignment information from neighboring APs and transmit this information to the MU 180 through its beacon signal to reduce scanning time. Furthermore, the exemplary embodiments of the system 100 may eliminate the scanning process by determining which specific AP the MU is going to associate with prior to the MU initiating the scanning process. Specifically, as will be described in greater detail below with reference to FIGS. 3, 4a, and 4b, scanning time may be eliminated by having detector APs (not shown) and/or sensors (not shown) track the location and movement of the MU 180 and the location data may be used to anticipate the specific AP 110-170 the MU 180 is moving towards.

Figure 2:
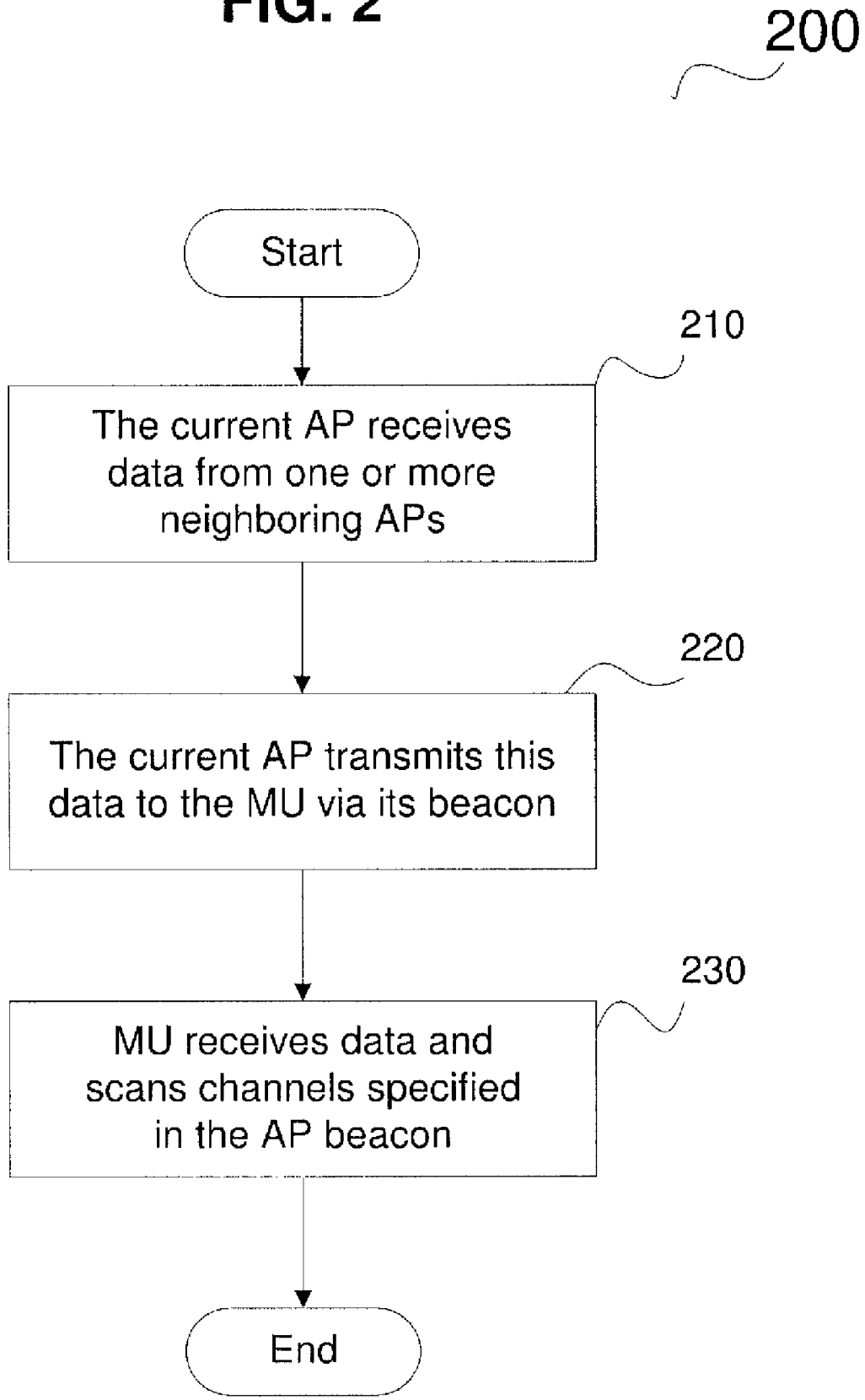
FIG. 2 shows an exemplary method for reducing the scanning time of the MU while roaming within the wireless communications according to the present invention.

FIG. 2 shows an exemplary method 200 for reducing the scanning time of the MU 180 while roaming within the wireless communications according to the present invention. The exemplary method 200 will be described with reference to the exemplary system 100 of FIG. 1. According to the present invention, the method 200 may reduce the scanning time required for the MU 180 to disassociate with its current AP (e.g., AP1 110) and associate with one of the neighboring APs (e.g., AP2 120-AP7 140). The current AP1 110 may be described as the AP in which the MU 180 is associated with at the present time. The neighboring APs 120-140 may be any APs throughout the network in which the MU 180 may associate with as the MU 180 roams in the network.

In step 210, the current AP1 110 may receive communication data (e.g., AP information) from one or more of the neighboring APs (e.g., AP2 120, AP3 130, and AP4 140) via an AP beacon signal. In other words, the current AP1 110, may gather information from any nearby AP by looking into the beacon signals from the neighboring APs. Specifically, the information gathered may include channel assignment information, as well as further information such as load amount, a basic service set identifier ("BSSID"), timestamp, etc. A load amount may be described as the number of clients (e.g., MUs) that are currently associated with a particular AP, as well as a bandwidth demand level for these clients. Accordingly, it may be preferable to avoid associating the MU 180 with an AP having a large load amount (e.g., an overloaded AP).

According to one exemplary operating environment, the APs 110-180 may be communicating on the 802.11a protocol. Furthermore, there may be a total of nine non-overlapping channels in this protocol. For example, AP1 110 may operate on channel 48, AP2 120 may operate on channel 153, AP3 130 may operate on channel 40, and AP4 140, may operate on channel 161. Therefore, this channel assignment information for the neighboring APs 120-140, as well as any additional AP-specific information, may be transmitted via beacon signals (e.g., each beacon signal form APs 120-140) and then received by the current AP1 110. Those skilled in the art will understand that in addition to neighboring AP channels, the exemplary beacon signals may also include packet information, a Media Access Control ("MAC") addresses, 802.11 management information, a frame check sequence ("FCS"), etc.

In step 220, the current AP1 110 may transmit this AP information received from the neighboring APs 120-140 to the MU 180 via its beacon signal (e.g., the beacon signal from AP1 110). It should be noted that similar to the neighboring APs 120-140, the current AP1 110 may also transmit information specific to AP1 110 (e.g., AP1's channel, AP1's load amount, etc.) for each of the neighboring APs 120-140 to receive. As described above, this information may inform the MU 180 as to which channels are available from the neighboring APs 120-140.

Furthermore, it should be noted that if the current AP1 110 has detected radar, any change in the respective channels of the neighboring APs 120-140 may be easily identified and updated in the beacon transmitted from the AP1 110. In addition, if the current AP1 110 is performing dynamic frequency selection ("DFS") scanning, then that AP1 110 may be omitted from the scan performed by the MU 180. In other words, when the Ap1 110 detects radar, it may send a notification to one of the neighboring APs 120-140 either via the wireless switching device 105 or, alternatively, directly conveying its current state. Upon receiving this notification, the neighboring APs 120-140 may then update their beacons to reflect this change of state. The MU 180 may then receive this beacon and may respond accordingly (e.g., by omitting AP1 110 from its scan).

In step 230, the MU 180 may receive the transmitted information and scan the channels specified in the beacon of the current AP1 110. In other words, the MU 180 may be made aware of the channels available at each of the neighboring APs 120-140. As described above, the MU 180 may perform either an active scan of the available channels or a passive scan. Therefore, by seeing the AP-specific information in the beacon signal, the MU 180 may scan only these channels. In addition, the MU 180 may receive further information, such as the load amount at each of the neighboring AP 120-140, in order for the MU 180 to make a better decision as to which AP it should associate with as the MU 180 roams. For example, the MU 180 may choose to avoid associating with an overloaded AP (or scan for that AP after scanning for the other APs).

In a conventional network, a roaming MU would need to scan all nine channels (i.e., in the case of passive scanning), or send probe requests in all nine channels (i.e., in the case of active scanning). This conventional method may take 400 milliseconds to perform. However, method 200 allows for the MU 180 to avoid scanning all of the nine non-overlapping channels in the network, and limit the scanning to the channels of the neighboring APs 120-140. Accordingly, this may drastically reduce the overall time required for the MU 180 to disassociate with the current AP1 110 and associate with a neighboring AP 120-140 as the MU 180 roams away from the current AP1 110. Thus, VoIP applications, as well as other high priority applications may benefit from the reduced scanning time achieved from the method 200.

While the embodiment discussed for method 200 describes the network as being of the 802.11a protocol, the method 200 is not limited to any particular wireless communication protocol. For example, the method 200 may be applicable for the 802.11b/g protocols. Therefore, as opposed to having the nine non-overlapping channels of the 802.11a protocol, the 802.11b/g protocols may have a total of 13 channels with only three channels that are non-overlapping.

FIG. 3 shows an exemplary method 300 for eliminating the scanning time of the MU 180 while roaming within the wireless communications according to the present invention. The exemplary method 300 will be described with reference to the exemplary system 100 of FIG. 1. According to the present invention, the method 300 may eliminate the scanning time required for the MU 180 to disassociate with its current AP (e.g., AP1 110) and associate with one of the neighboring APs (e.g., AP2 120-AP4 140).

As opposed to the exemplary method 200 wherein the MU 180 is limited to scanning only the channels of neighboring APs 120-140, the MU 180 in method 300 knows of the APs 120-170 it is going to associate with prior to the MU 180 scanning a specific channel. As will be described below, the location of the MU 180 may be determined and tracked in order to determine which of the neighboring APs 120-140 will service the MU 180 as it roams away from the current AP1 110. Accordingly, the method 300 may avoid any overhead created with unnecessary scanning performed by the MU 180. In other words, the MU 180 may selectively associate with a new AP only when movement is tracked by the method 300.

Figure 4A:
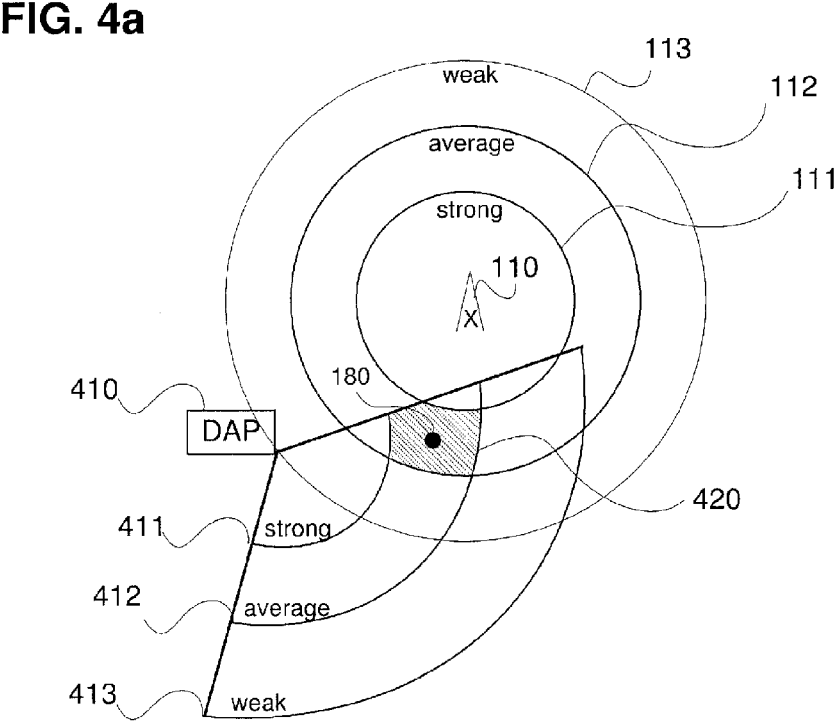
FIGS. 4a and 4b show and exemplary system for tracking the MU as it roams about the wireless communication network according to the present invention.
Figure 4B:
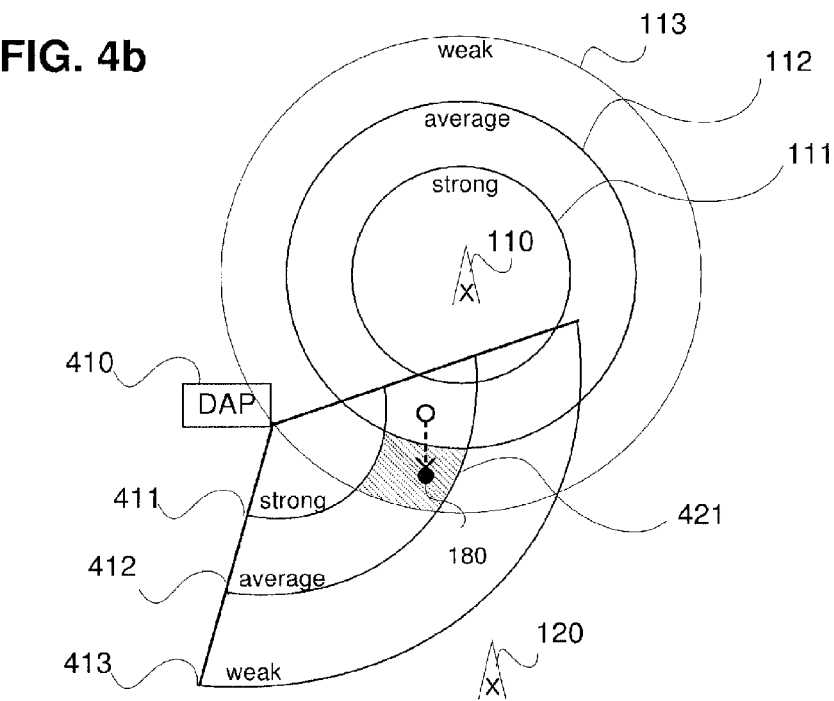

FIGS. 4a and 4b show an exemplary system 400 for tracking the MU 180 as it roams about the wireless communication network according to the present invention. As illustrated in FIGS. 4a and 4b, the system 400 includes the MU 180, the current AP1 110, and at least one sensor, such as a detector AP ("DAP") 410. Thus, method 300 may eliminate the scanning time of the MU 180 through the ability of the DAP 410 to track the location and movement of the MU 180. The functionalities of the AP1 110 and the DAP 410 will be described in greater detail below.

In steps 310-330, the method 300 may determine a current location of the MU 180. The current location of the MU 180 is illustrated in FIG. 4a. Initially, in step 310 the method 300 may measure a strength of signal between the MU 180 and the current AP1 110. As illustrated in FIG. 4a, the AP1 110 may include a plurality of measurable range strengths, such as, for example, a strong signal range 111, an average signal range 112, and a weak signal range 113. It should be noted that while FIG. 4a depicts the AP1 110 as having three discrete signal ranges 111-113, these ranges are merely for illustration purposes as any number of range measurements may be utilized for determining a strength of signal between the MU 180 and the current AP1 110.

According to the example illustrated in FIG. 4a, the strength of signal between the MU 180 and the AP1 110 may be within the average signal range 112. Thus, the location of the MU 180 may lie anywhere within this range area from the AP1 110.

In step 320, the method 300 may measure a strength of signal between the MU 180 and the DAP 410. As illustrated in FIG. 4a, the DAP 410 may be a semi-directional antenna including a plurality of measurable range strengths, such as, for example, a strong signal range 411, an average signal range 412, and a weak signal range 413. It should be noted that while FIG. 4a depicts the DAP 410 as having three discrete signal ranges 411-413, these ranges are merely for illustration purposes as any number of range measurements may be utilized for determining a strength of signal between the MU 180 and the current DAP 410. Furthermore, the DAP 410 is not limited to having a semi-directional antenna and may provide coverage in any and/or all directions from the DAP 410.

According to the example illustrated in FIG. 4a, the strength of signal between the MU 180 and the DAP 410 may be within the average signal range 412. Thus, the location of the MU 180 may lie anywhere within this range area from the DAP 410.

In step 330, the method 300 may calculate a coincidence area 420 and position the MU 180 within the coincidence area 420. Specifically, the coincidence may be described as the area in which the AP1 range area of step 310 overlaps with the DAP range area of step 320. In other words, by measuring the strength of signals of the MU 180 from both the AP1 110 and the DAP 410, the location of the MU 180 may be narrowed down to the overlapping range areas. According to the example illustrated in FIG. 4a, the coincidence area 420 is the shaded region within the overlapping average range areas (e.g., range area 112 and range area 412). Thus, the location of the MU 180 may be confined to this coincidence area 420.

In step 340, the method 300 may provide the wireless switching device 105 with location information of the MU 180 based on this coincidence area 420. Specifically, the wireless switching device 105 may obtain a current location of the MU 180 from the DAP 410. Based on the current location, the wireless switch 105 may provide the MU 180 with information on the available APs. For example, this information may be transmitted within a wireless network management protocol ("WNMP") packet. If the MU 180 remains stationary, the WNMP packet may simply include information on the current AP1 110, such as the channel of the AP1 110, the MAC address of the AP1 110, and the load on the AP1 110. However, once the MU 180 moves, the wireless switching device 105 may update the WNMP packet to account for additional APs.

In step 350, the method 300 may determine a new location of the MU 180 once the MU 180 has started to roam. The new location of the MU 180 is illustrated in FIG. 4b. According to the exemplary embodiments of the method 300, a roam by the MU 180 may be detected through a change in either the strength of signal between the MU 180 and the current AP1 110 or the strength of signal between the MU 180 and the DAP in order to reposition the MU 180 in a new location. Specifically, as illustrated in FIG. 4b, the strength of signal between the MU 180 and the AP1 110 may now be within the weak signal range 113 and the strength of signal between the MU 180 and the DAP 410 may remain within the average signal range 412. Thus, the location of the MU 180 may now lie within the new coincidence area 421. Accordingly, the new location of the MU 180 may be confined to this new coincidence area 421.

In step 360, the method 300 may project a direction of movement of the MU 180 and track any further changes in the location of the MU 180. Specifically, by knowing the previous and the current location of the MU 180, and by also knowing the variations in the strength of signals from the current AP1 110 and the DAP, the movement of the MU 180 may be tracked. According to the example illustrated in FIG. 4a, the direction of the movement of the MU 180 may be projected as toward the AP2 120.

Furthermore, based on the projected movement of the MU 180, the wireless switch 105 may update the WNMP packet and provide the MU 180 with information on the AP2 120. Specifically, the MU 180 may receive WNMP packet that now includes information, such as the channel of the AP2 120, the MAC address of the AP2 120, and the load on the AP1 120.

In step 370, the method 300 may determine if there are more than one APs within the same range of the MU 180 to the new location of the MU 180. If only one AP best suits the need of the MU 180, then the method may advance to step 380. However, if more than one APs are available at a similar range to the new location, then in step 375, an appropriate AP may be selected base on the respective load information at each available AP. For example, if AP2 120 was overloaded and a further AP was within range of the MU 180 with minimal load, the MU 180 may decide to associate with the further AP.

In step 380, the MU 180 may send an association request to join the appropriate new AP2 120 based on the received WNMP packet. Specifically, the MU 180 may be handed off completely from the current AP1 110 to the new AP2 120. During the complete handoff, the wireless switching device 105 may cease the data transfers between the AP1 110 and the MU 180 over their respective transceivers as the MU 180 roams beyond the coverage range of the AP1 110. Accordingly, the MU 180 may now be in communication with the AP2 120.

Thus, according to the method 300, the DAP 410 may inform the wireless switching device 105 of the location, or projected location, of the MU 180. Then, the wireless switching device may transmit information pertains to the AP in which the MU 180 is going to roam towards, wherein the AP information is transmitted in a WNMP packet. As described above, the wireless switching device 105 may continuously update the WNMP packet based on the received location information. Once the MU 180 receives the WNMP packet, the MU 180 may use the channel assignment information, as well as other information (e.g., load amount, etc.), in order to associate with a new AP.

It should be noted that in the above exemplary method, a specific location determining method was used to determine the location of the MU 180. However, the present invention is not limited to this location method. That is, any location determining method may be implemented in conjunction with the present invention.

While the exemplary embodiments of the present invention describe various methods and manners for reducing and/or eliminating scanning time while the MU 180 is roaming, those skilled in the art will understand that the principles and functionalities described herein may be performed in a software program, a component within a software program, a hardware component, or any combination thereof. One example would be a set of instructions stored on a computer readable storage medium (e.g. memory) executable by a processor, where the set of instructions may perform the various methods and manners according to exemplary embodiments of the present invention.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
   receiving channel assignments for each of one or more access points within a network;
   projecting a new location of a mobile unit within the network;
   transmitting the channel assignments of only the access point at the new location to the mobile unit within the network, wherein the mobile unit is associated with a first access point and the mobile unit associates with the access point at the new location based on the channel assignments of that access point as the mobile unit roams to that access point.

2. The method according to claim 1, wherein the network is an IEEE 802.11 local area network, wherein the channel assignments are received in beacon signals from the access points and provided to the mobile unit in the beacon signal from the first access point.

3. The method according to claim 1, further comprising that when the first access point detects radar, the first access point notifying one neighboring access point to update its beacon to reflect a change of state.

4. The method according to claim 1, wherein the receiving step and the transmitting step are performed by a wireless switching device.

5. A method, comprising:
   associating, by a mobile unit, with a first access point within a network;
   projecting a new location of the mobile unit;
   receiving channel assignments of at least one access point at the new location from the first access point; and
   associating with one of the at least one access point at the new location based on the channel assignments of that access point.

6. The method according to claim 5, wherein if there are more than one access point available at the new location, associating to one access point is selected based on respective load information at each access point at the new location.

7. The method according to claim 5, further comprising:
   limiting a scanning function performed by the mobile unit to scanning the channel assignments of only the access point at the new location.

8. The method according to claim 5, further comprising:
   tracking a location of the mobile unit with detector access points having semi-directional antennas.

9. A system, comprising:
   a first access point operable for receiving channel assignments for each of one or more additional access points within a network, the first AP operable for transmitting the channel assignments of only the access point at a projected new location of a mobile unit within the network to the mobile unit, wherein the mobile unit is associated with the first AP; and
   a wireless switching device operable for projecting the new location of the mobile unit and associating the mobile unit with the access point at the new location based on the channel assignments of that access point as the mobile unit roams toward that access point.

10. A computing device, comprising:
a data receiving means for receiving channel assignments for each of one or more access points within a network;
a location projecting means for projecting a new location of a mobile unit within the network;
a transmitting means for transmitting the channel assignments of only the access point at the new location to the mobile unit within the network, wherein the mobile unit is associated with a first access point and the mobile unit associates with the access point at the new location based on the channel assignments of that access point as the mobile unit roams to that access point.

11. A mobile computing device, comprising:
a communicating means for communicating with a first access point within a network, wherein the mobile computing device is associated with the first access point;
a data receiving means for receiving channel assignments for only one access point at a projected new location of the mobile computing device within the network; and
an associating means for associating with the one access point at the new location when the mobile computing device roams to the new location based on the channel assignments for that one access point.

12. The mobile computing device according to claim 11, further comprising:
a scanning means for limiting a scanning function performed by the mobile computing device to scanning the channel assignments of only the access point at the new location.

* * * * *

UNITED STATES PATENT AND TRADEMARK OFFICE
CERTIFICATE OF CORRECTION

| | | |
|---|---|---|
| PATENT NO. | : 8,121,091 B2 | Page 1 of 1 |
| APPLICATION NO. | : 12/207232 | |
| DATED | : February 21, 2012 | |
| INVENTOR(S) | : Kannan | |

It is certified that error appears in the above-identified patent and that said Letters Patent is hereby corrected as shown below:

In Column 5, Line 60, delete "140)." and insert -- 170). --, therefor.

In Column 9, Line 20, delete "120." and insert -- 110. --, therefor.

Signed and Sealed this
Eighteenth Day of December, 2012

David J. Kappos
*Director of the United States Patent and Trademark Office*